US008198761B1

(12) United States Patent
Sanford (10) Patent No.: US 8,198,761 B1
(45) Date of Patent: Jun. 12, 2012

(54) MAGNET DRIVE MOTOR

(76) Inventor: Richard Eugene Sanford, New Bethlehem, PA (US)

(*) Notice: Subject to any disclaimer, the term of this patent is extended or adjusted under 35 U.S.C. 154(b) by 414 days.

(21) Appl. No.: 12/536,432

(22) Filed: Aug. 5, 2009

(51) Int. Cl.
 *H02K 33/00* (2006.01)
(52) U.S. Cl. .............................. 310/15; 310/152; 310/26
(58) Field of Classification Search .................. 310/15, 310/23, 24, 26, 152, 156.08, 156.32, 156.38, 310/156.43
See application file for complete search history.

(56) References Cited

U.S. PATENT DOCUMENTS

| 788,291 | A | * | 4/1905 | Titzel, Sr. .......................... 310/46 |
|---|---|---|---|---|
| 1,932,146 | A | | 10/1933 | Ruckelshaus |
| 3,676,719 | A | | 7/1972 | Pecci |
| 4,068,645 | A | | 1/1978 | Jenkinson |
| 4,156,817 | A | * | 5/1979 | Preece et al. ................. 290/38 R |
| 4,317,058 | A | | 2/1982 | Blalock |
| 4,450,373 | A | * | 5/1984 | Miller et al. .................... 310/51 |
| 4,523,114 | A | | 6/1985 | Smith |
| 4,532,901 | A | * | 8/1985 | Sturdy ........................... 123/333 |
| 4,537,167 | A | | 8/1985 | Eudier et al. |
| 4,749,893 | A | | 6/1988 | Reynolds |
| 5,057,724 | A | | 10/1991 | Patton |
| 5,219,034 | A | * | 6/1993 | Wortham ................... 180/65.31 |
| 5,233,251 | A | * | 8/1993 | Nehmer ......................... 310/167 |
| 5,457,349 | A | * | 10/1995 | Gifford .......................... 310/24 |
| 5,592,036 | A | * | 1/1997 | Pino ............................... 310/24 |
| 5,757,093 | A | * | 5/1998 | Susliaev et al. ................. 310/24 |
| 5,996,209 | A | * | 12/1999 | Molnar et al. .................. 29/596 |
| 6,208,054 | B1 | | 3/2001 | Tajima et al. |
| 6,433,452 | B1 | | 8/2002 | Graham |
| 6,713,933 | B2 | | 3/2004 | Martin |
| 7,105,958 | B1 | * | 9/2006 | Elmaleh .......................... 310/24 |
| 7,406,940 | B2 | | 8/2008 | Nishimura et al. |
| 2002/0121815 | A1 | | 9/2002 | Sullivan |
| 2005/0127767 | A1 | * | 6/2005 | Gallant .......................... 310/113 |
| 2005/0184613 | A1 | * | 8/2005 | Minato et al. ................. 310/178 |
| 2005/0188942 | A1 | | 9/2005 | Hamada et al. |
| 2007/0182262 | A1 | | 8/2007 | Johnson |

FOREIGN PATENT DOCUMENTS

| JP | 9096274 | 4/1997 |
|---|---|---|
| JP | 200203150 | 10/2002 |
| WO | WO2006/045333 | 5/2006 |

OTHER PUBLICATIONS http://www.cycclone.us—Home page—Cycclone Magnetic Engines, Inc.
http://www.greenoptimistic/2008/07/17/ How-to-make-snadeep-acharya-magnetic-motor/ Article: Schematic of How to Build a Magnetic Motor Article: Magnetic Miracle.

* cited by examiner

*Primary Examiner* — Quyen Leung
*Assistant Examiner* — Naishadh Desai
(74) *Attorney, Agent, or Firm* — Michael I. Kroll

(57) ABSTRACT

A magnetic drive motor includes a housing; a plurality of cylinders bored in the housing, each cylinder having an upper end; a piston reciprocatingly received within each cylinder; a cylinder head covering the upper end of each cylinder; an electromagnet secured within each cylinder head; a source of electrical energy coupled with each electromagnet for delivering electrical energy to each said electromagnet; means for controlling delivery of electrical energy to each electromagnet such that when the electromagnet receives electrical energy, the electromagnet produces a magnetic force which impinges and attractive force upon the piston, urging the piston toward the electromagnet; and a magnetic shield within each cylinder, each magnetic shield actuatable between a first position shielding the piston from the magnetic force produced by the electromagnet and a second position exposing the piston to the magnetic force produced by the electromagnet.

15 Claims, 10 Drawing Sheets

MAGNET DRIVE MOTOR

BACKGROUND OF THE INVENTION

1. Field of the Invention

The present invention relates generally to motors and, more specifically, to a magnetic motor comprising a housing having a plurality of bores forming cylinders whereupon an electromagnet impinges a magnetic force upon a cylinder piston to initiate a piston cycle by drawing the cylinder piston toward the magnet and actuating positioning of a magnetic shield therebetween releasing the piston to travel by gravity and cam momentum through a repetitive cycle of piston attraction and piston release to generate electrical power and mechanical power for a motor vehicle motive force.

2. Description of the Prior Art

There are other electromagnet drives designed for motors. Typical of these is U.S. Pat. No. 1,932,146 issued to Ruckelshaus on Oct. 24, 1933.

Another patent was issued to Pecci on Jul. 11, 1972 as U.S. Pat. No. 3,676,719. Yet another U.S. Pat. No. 4,317,058 was issued to Blalock on Feb. 23, 1982 and still yet another was issued on Jun. 11, 1985 to Smith as U.S. Pat. No. 4,523,114.

Another patent was issued to Reynolds on Jun. 7, 1988 as U.S. Pat. No. 4,749,893. Yet another U.S. Pat. No. 5,219,034 was issued to Wortham on Jun. 15, 1993. Another was issued to Pino on Jan. 7, 1997 as U.S. Pat. No. 5,592,036 and still yet another was issued on Aug. 13, 2002 to Graham as U.S. Pat. No. 6,433,452.

Another patent was issued to Elmaleh on Sep. 12, 2006 as U.S. Pat. No. 7,105,958. Japanese Patent No. JP9096274 was published to Sato on Apr. 8, 1997 and another was published to Sato on Oct. 18, 2002 as Japanese Patent No. JP2002303150. International Publication No. WO2006/045333 was published on May 4, 2006 to Brady.

U.S. Pat. No. 1,932,146

Inventor: John G. Ruckelshaus

Issued: Oct. 24, 1933

An oscillatory motor of the character described comprising a supporting member, a pendulum acting actuator arm pivotally supported thereon, an actuating magnet for operating the arm comprising a coil supported upon the arm at its lower end, a fixed armature to cooperate therewith having a portion curved to conform to the path of movement of the coil and a circuit interrupting switch arranged to be actuated by the movement of the arm for intermittently closing the energizing circuit.

U.S. Pat. No. 3,676,719

Inventor: Angelo A. Pecci

Issued: Jul. 11, 1972

Apparatus for converting electrical energy into rotary motion for performing work, such as driving a wheeled vehicle. The apparatus includes a plurality of electromagnetic solenoids with the core of each solenoid being eccentrically connected to a driving gear which meshes with a driven gear carried by a drive shaft to gain a mechanical advantage and cause rotation of the drive shaft. The solenoids are energized sequentially to cause continuous rotation of the drive shaft.

U.S. Pat. No. 4,317,058

Inventor: Sherman S. Blalock

Issued: Feb. 23, 1982

An electro-magnetic reciprocating engine and method for converting an internal combustion engine to an electro-magnetic reciprocating engine wherein the cylinders are replaced with nonferromagnetic material and the pistons reciprocally disposed therein are replaced with permanent magnet pistons. An electro-magnet is disposed at the outer end of each cylinder. A switching and timing apparatus is operably connected between a DC electrical power source and the electro-magnets whereby the creation of a magnetic field about said electro-magnet will interact with the magnetic field about the permanent magnet pistons to effect reciprocal motion of said pistons within the cylinders. Oil rings are provided around said pistons whereby lubrication can be effected in the same manner as provided in an internal combustion engine.

U.S. Pat. No. 4,523,114

Inventor: Raymond H. Smith

Issued: Jun. 11, 1985

A magnetic reciprocating motor including a block with a crankshaft journalled therein and a cylinder with inboard and outboard portions mounted thereon. A piston with a piston magnet is slidably disposed in the cylinder inboard portion. A carrier assembly reciprocates within the cylinder outboard portion and has a carrier magnet mounted thereon. A head magnet is mounted on a cylinder head attached to the cylinder outboard portion. An electrical distribution system is provided for selectively energizing at least one of the magnets to induce repulsion therebetween for reciprocating the piston and carrier assembly within the cylinder.

U.S. Pat. No. 4,749,893

Inventor: Billy D. Reynolds

Issued: Jun. 7, 1988

This invention is an engine with reciprocating piston slidingly mounted within a cylinder and connected to a rotatable shaft. The piston is driven back and forth within the cylinder by a pair of electromagnets to obtain rotary power. A secondary winding around one of the electromagnets produces an alternating current. An anti-arc relay is also provided to prevent burning of the high voltage contacts.

U.S. Pat. No. 5,219,034

Inventor: Charles Wortham

Issued: Jun. 15, 1993

A vehicle powered by a magnetic engine, which engine includes a block fitted with multiple cylinders for receiving magnetic pistons attached to a crankshaft and electromagnets mounted in the engine head for magnetically operating the magnetic pistons by electric current reversal. A polarity timer is connected to the vehicle battery through a variable resistor which serves as an accelerator to vary the current through the respective electromagnets and operate the magnetic pistons at a desired speed. Alternating current is generated at the rear axle of the vehicle by means of an alternating current generator, which current is stepped up and rectified to direct current for charging the battery, by operation of a battery charging device.

U.S. Pat. No. 5,592,036

Inventor: Raul M. Pino

Issued: Jan. 7, 1997

An improved engine construction having a reciprocating piston attached to a rotating crankshaft contains, proximate the piston head, a permanent magnet. A cylinder, confining the piston, has a head with an electromagnet located therein. A timed switching system reverses the polarity of the electromagnet, thus alternately attracting and repelling the piston and driving the attached rotating crankshaft.

U.S. Pat. No. 6,433,452

Inventor: W. Ralph Graham

Issued: Aug. 13, 2002

By this invention, rotation of an output shaft is achieved by means of a magnetic motor comprising a vertically movable power rod and a rotatable balance wheel wherein multiple permanent magnets are affixed to the outer periphery of the balance wheel and a single permanent magnet is affixed to the power rod so that the magnets on the balance wheel come into intermittent proximity to the magnet on the power rod by which the magnetic forces between the magnets cause rotation to the output shaft.

U.S. Pat. No. 7,105,958

Inventor: Shimon Elmaleh

Issued: Sep. 12, 2006

An electro-magnetic engine in which the motive force is electro-magnetism. The electro-magnetic engine comprises a housing structure, cylinder assembly, crankcase assembly, crankshaft assembly, electro-magnetism system and an electrical system. The electro-magnetism system consists of a coil assembly arranged stationary in the housing. The electromagnetic engine includes the rotation of the crankshaft in a predetermined direction continuously after the initial activation of the crankshaft by assembly of applying a short period of the external force, such as from an automobile starter. At least three alternators are connected to the rotating crankshaft and work at 35 amps each to recharge batteries.

Japan Patent Number JP9096274

Inventor: Bunji Sato

Published: Apr. 8, 1997

PROBLEM TO BE SOLVED: To prevent generation of public pollution, reduce industrial waste and make an engine easy to use. SOLUTION: In both a main engine and auxiliary permanent magnet engines, all power sources are obtained from magnetic force of a permanent magnet. A roller type permanent magnet of the main engine is fixed to the center of a rear wheel axle of a car body, in a position oppositely facing this magnet, a cylindrical permanent magnet is set up in a condition movable forwardly/reversely, to the connected to a driving wheel with a connecting rod, piston rod, cross head, main rod, side rod and a lock tight, and set up by a mechanism making reverse action of a magnetic force characteristic. For the purpose assisting a smooth motion of the main engine, the auxiliary engines are set up in the upper part outside of the main driving wheel and a rear wheel, in/out ports of a connecting rod is set up toward a front wheel direction. The auxiliary engine is set up in an upper part of the axle center of the main moving wheel, the connecting rod is connected to a crankshaft of the front wheel, so as to smooth rotation of the axle, and continuous operation can be performed.

Japan Patent Number JP200203150

Inventor: Yoshihiro Sato

Published: Oct. 18, 2002

PROBLEM TO BE SOLVED: To solve problems in conventional engine technology that the considerable energy is needed when increasing the motive power, for example, in sudden acceleration of an automobile, which needs the corresponding excess fuel, whereby the fuel-saving for the engine of the automobile and the like which seldom travels at a constant speed, can not be promoted, and saving of the fuel for the engine of the automobile which causes the air-pollution, remains to be solved. SOLUTION: A magnet mounted on a piston and a magnet mounted on a cylinder are interacted when increasing the motive power, which interpolates the reciprocating motion of the piston in an exhaust stroke and a compression stroke, and assists the excess energy in an expansion stroke which has been needed in the exhaust stroke and the compression stroke, whereby the fuel necessary for generating the excess energy in the expansion stroke can be saved.

International Publication Number WO2006/045333

Inventor: Mike Brady

Published: May 4, 2006

The invention provides a magnetic repellent motor which comprises: a shaft rotatable about its longitudinal axis, a first set of magnets arranged about the shaft in a rotor for rotation with the shaft, and a second set of magnets arranged in a stator surrounding the rotor, wherein the second set of magnets is in interaction with the first set of magnets, wherein the magnets of the first and second sets of magnets are at least partially magnetically screened so as to concentrate their magnetic field strength in the direction of the gap between rotor and stator.

While these magnetic motors may be suitable for the purposes for which they were designed, they would not be as suitable for the purposes of the present invention, as hereinafter described.

SUMMARY OF THE PRESENT INVENTION

A primary object of the present invention is to provide an electromagnetic driven piston using a magnetic shield during the piston cycle.

Another object of the present invention is to provide a magnetic shield comprising an inorganic material formed as a plate mechanically driven over the cylinder bore at a predetermined piston cycle stroke.

Yet another object of the present invention is to provide a magnetic shield wherein said inorganic plate material is a polymeric material.

Still yet another object of the present invention is to provide a magnetic shield wherein said polymeric material is a plastic material.

Another object of the present invention is to provide a magnetic shield wherein the polymeric shield contains a material forming a receptor for magnetic flux fields generated by the electromagnet.

Yet another object of the present invention is to provide a magnetic shield wherein the polymeric shield contains device for generating an opposing magnetic flux field to that of the electromagnet thereby shielding the cylinder from the electromagnetic field.

Still yet another object of the present invention is to provide air to the cylinders through air intake and air filter.

Additional objects of the present invention will appear as the description proceeds.

The present invention overcomes the shortcomings of the prior art by providing a magnetic drive motor for a motor vehicle which includes a housing; a plurality of cylinders bored in the housing, each cylinder having an upper end; a piston reciprocatingly received within each cylinder; a cylinder head covering the upper end of each cylinder; an electromagnet secured within each cylinder head; a source of electrical energy coupled with each electromagnet for delivering electrical energy to each said electromagnet; means for controlling delivery of electrical energy to each electromagnet such that when the electromagnet receives electrical energy, the electromagnet produces a magnetic force which impinges and attractive force upon the piston, urging the piston toward the electromagnet; and a magnetic shield within each cylinder, each magnetic shield actuatable between a first position shielding the piston from the magnetic force produced by the electromagnet and a second position exposing the piston to the magnetic force produced by the electromagnet.

The foregoing and other objects and advantages will appear from the description to follow. In the description reference is made to the accompanying drawings, which forms a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying drawing in which.

DESCRIPTION OF THE REFERENCED NUMERALS

Turning now descriptively to the drawings, in which similar reference characters denote similar elements throughout the several views, the figures illustrate the Magnet Drive Motor of the present invention. With regard to the reference numerals used, the following numbering is used throughout the various drawing figures.

10 Magnet Drive Motor of the present invention
12 motor vehicle
14 engine block
16 electromagnets
18 AC transformer
20 distributor
22 wires
24 crankshaft
26 cam shaft
28 cylinder
30 piston
32 compression rings
34 oil rings
36 brass sleeve
38 cylinder head
40 magnetic shield
42 insulation
44 cam system
46 pivot point
48 spring
50 large cam
52 small cam
54 pressure release
56 belt
58 alternator
60 power steering
62 air conditioning
64 accelerator pedal
66 voltage control
68 return spring
70 conductive member
72 semi-conducting material
74 polymeric medium
76 air intake
78 air filter

DETAILED DESCRIPTION OF THE PREFERRED EMBODIMENT

The following discussion describes in detail one embodiment of the invention (and several variations of that embodiment). This discussion should not be construed, however, as limiting the invention to those particular embodiments, practitioners skilled in the art will recognize numerous other embodiments as well. For definition of the complete scope of the invention, the reader is directed to appended claims.

Figure 1:
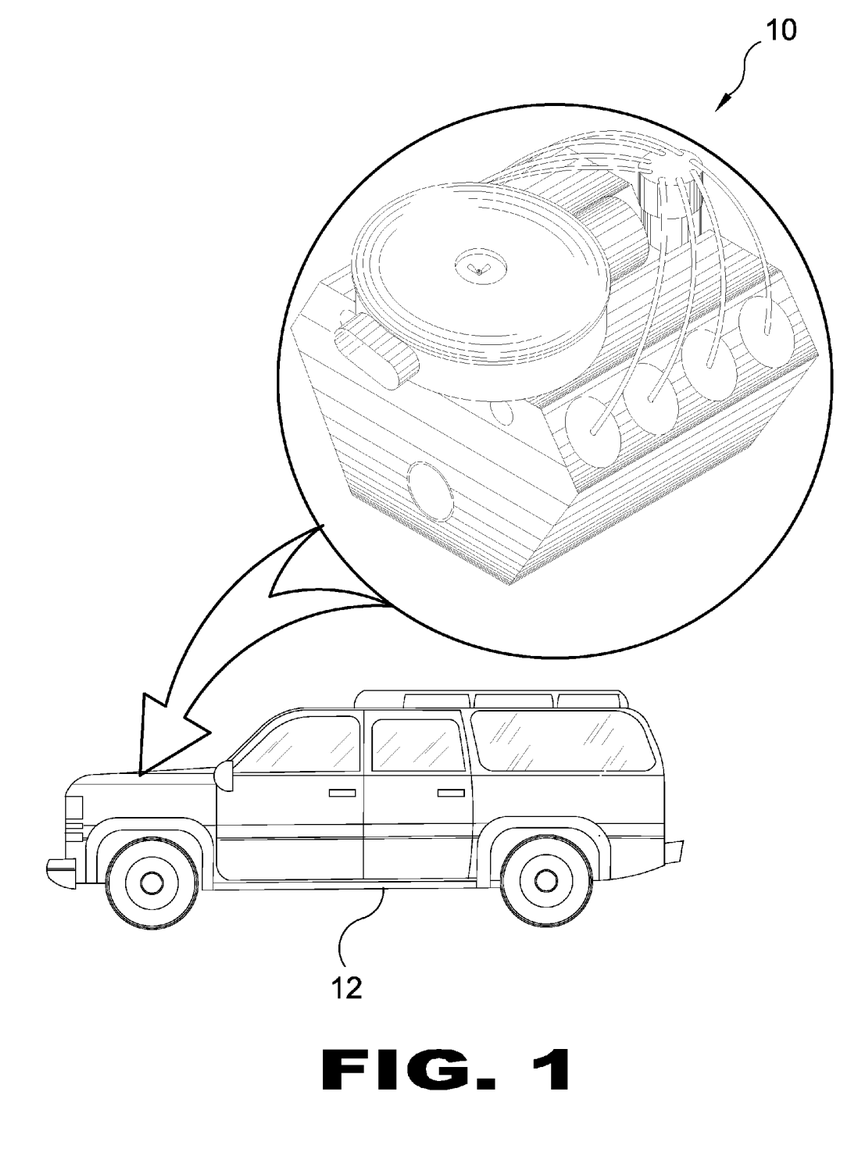
FIG. 1 is an illustrated view of the magnet drive motor of the present invention in a motor vehicle.

FIG. 1 is an illustrated view of the present invention. Shown is an illustrative view of the magnet drive motor 10 of the present invention installed in a motor vehicle 12. The present invention is a magnet drive motor 10 for converting electrical energy into mechanical energy for providing motive power to a motor vehicle 12.

Figure 2:
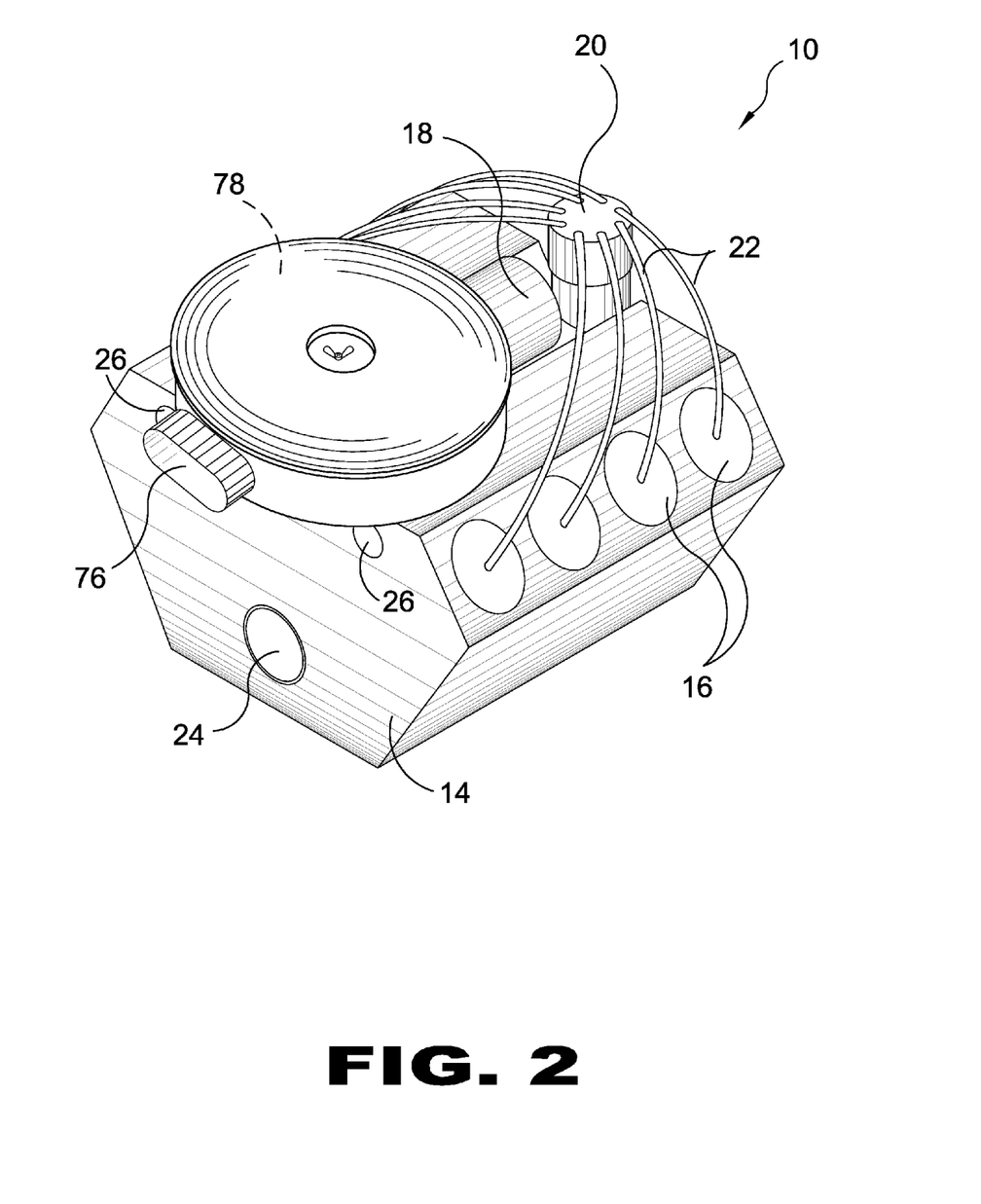
FIG. 2 is a perspective view of an embodiment of the magnet drive motor of the present invention.

FIG. 2 is a perspective view of an embodiment of the magnet drive motor 10 of the present invention. Shown is the present invention comprising an engine block 14 having a plurality of electromagnets 16 which are supplied electrical energy by an AC transformer 18 for converting and holding a predetermined amount of energy. The intervals for cyclic delivery of electrical energy is controlled by a distributor 20 and delivered via a plurality of electrically conducting wires 22. A crankshaft 24 couples the motor 10 to a drive train of a motor vehicle through a plurality of pistons. A plurality of cam shafts 26 run transversely through the engine block 14. Also shown is air intake 76 and air filter 78 supplying air to the pistons.

Figure 3:
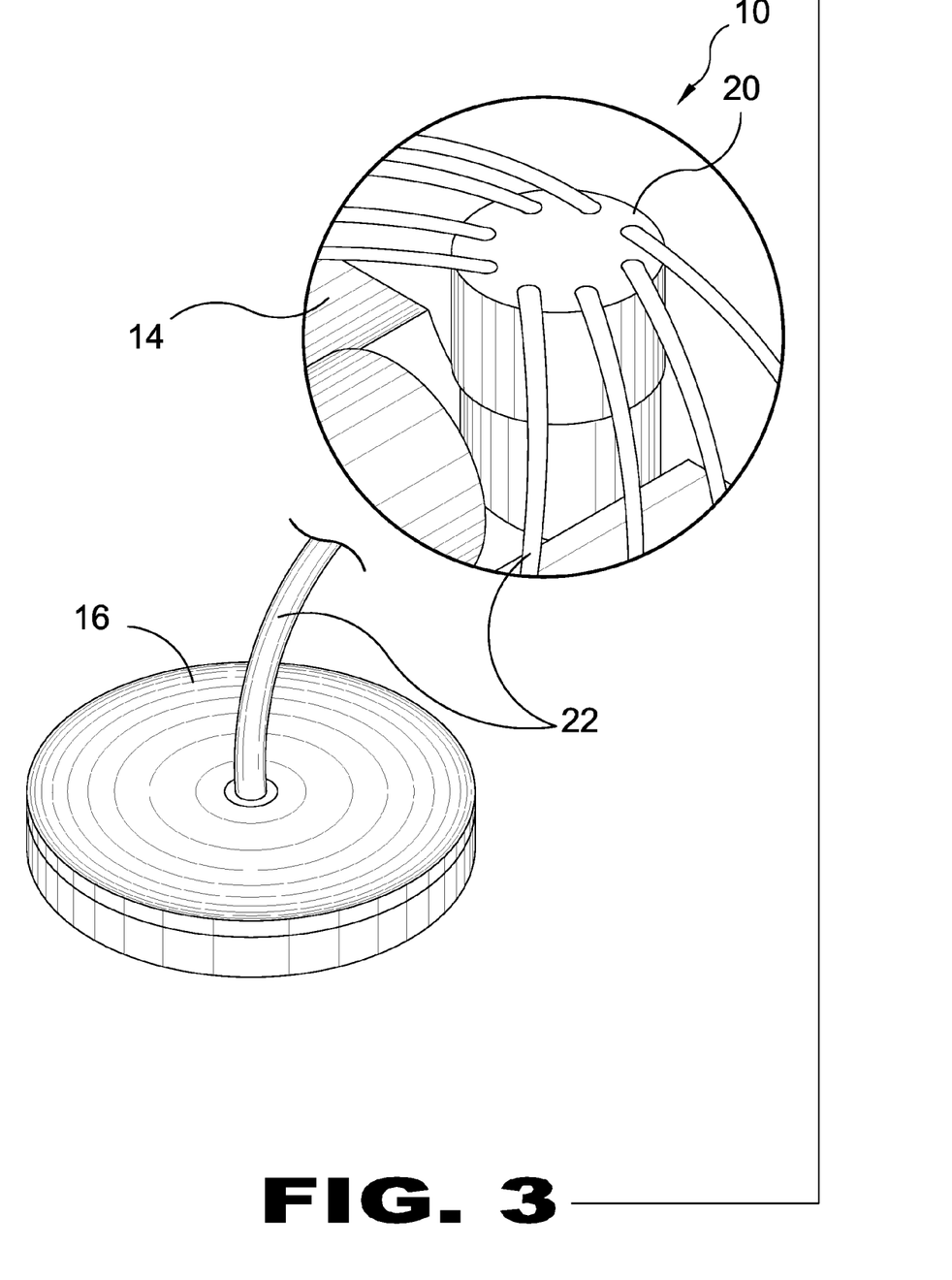
FIG. 3 is a detailed view of the electromagnet of the present invention.

FIG. 3 is a detailed view of the electromagnet 16 of the present invention 10. Shown is an electromagnet 16 of the present invention providing wires 22 carrying current to the electromagnet 16 at intervals determined by a distributor 20 affixed to the engine block 14.

Figure 4:
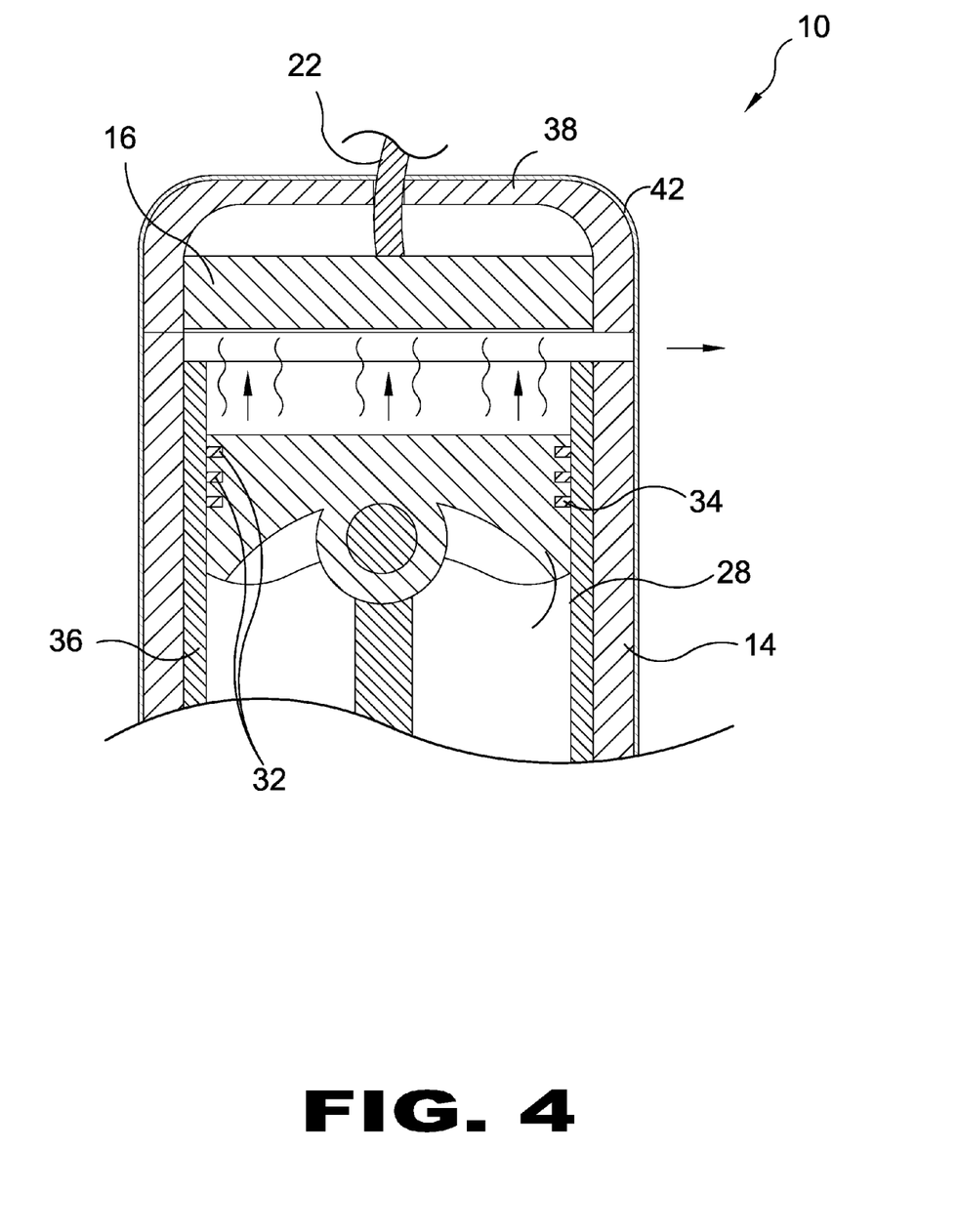
FIG. 4 is a cross-sectional view of a cylinder of the present invention during the upstroke portion of a piston cycle.

FIG. 4 is a cross-sectional view of a bored cylinder 28 in the engine block 14 of the present invention 10 during the upstroke portion of a piston cycle. Shown is the present invention having a piston 30 reciprocatingly received within the cylinder 28 with compression rings 32 and oil rings 34 within the cylinder 28 and a brass sleeve 36 lining the interior walls of the cylinder 28 for increased efficiency. The upper end of the cylinder 28 is covered by a cylinder head 38, and an electromagnet 16 is secured within the cylinder head 38. A wire 22 delivers electrical energy to the electromagnet 16, which produces a magnetic force which impinges upon the piston 30, urging the piston 30 toward the electromagnet 16 via unhindered magnetic force. A magnetic shield within the cylinder 28 is actuatable between a first position shielding the piston 30 from the magnetic force produced by the electromagnet 16 and a second position exposing the piston 30 to the magnetic force produced by the electromagnet 16. Additionally shown is the cylinder 28 having a coat of insulation 42 to prevent injury from electric shock, compression rings 32. a brass sleeve 36 and an oil ring 34.

Figure 5:
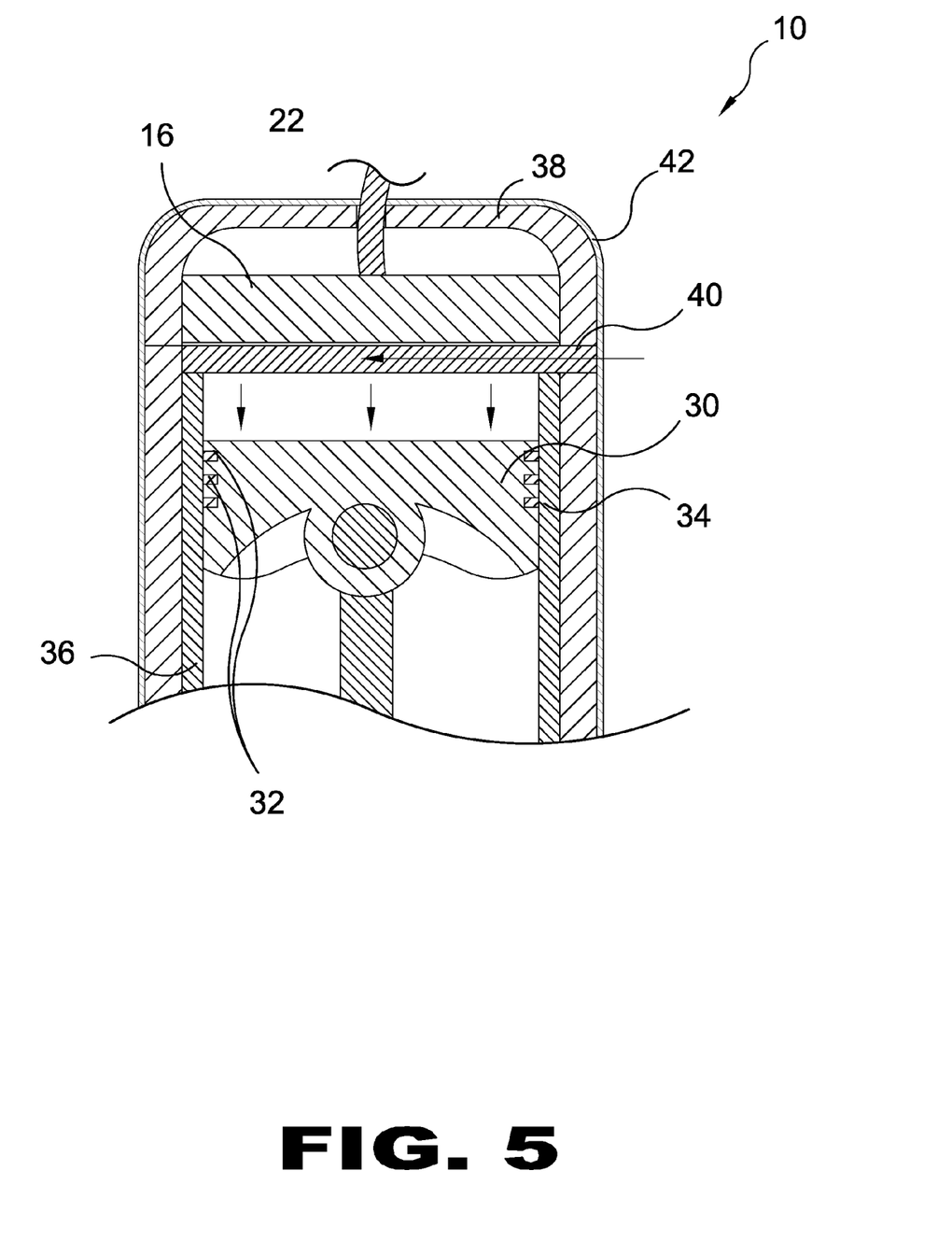
FIG. 5 is a cross-sectional view of a cylinder of the present invention during the downstroke portion of a piston cycle.

FIG. 5 is a cross-sectional view of a bored cylinder 28 in the engine block 14 of the present invention 10 during the downstroke portion of a piston cycle. Shown is the present invention having a piston 30 reciprocatingly received within the cylinder 28 with compression rings 32 and oil rings 34 within the cylinder 28 and a brass sleeve 36 lining the interior walls of the cylinder 28 for increased efficiency. The upper end of the cylinder 28 is covered by a cylinder head 38, and an electromagnet 16 is secured within the cylinder head 38. A wire 22 delivers electrical energy to the electromagnet 16, which produces a magnetic force which impinges upon the piston 30, urging the piston 30 toward the electromagnet 16 via unhindered magnetic force. A magnetic shield 40 within the cylinder 28 is actuatable between a first position shielding the piston 30 from the magnetic force produced by the electromagnet 16 and a second position exposing the piston 30 to the magnetic force produced by the electromagnet 16. Additionally shown is the cylinder 28 having a coat of insulation 42 to prevent injury from electric shock. When the electromagnet 16 is deactivated and a the magnetic shield 40 slid into place, gravity, momentive force and the crankshaft work in cooperation to bring the piston 30 back down to its bottom position.

Figure 6:
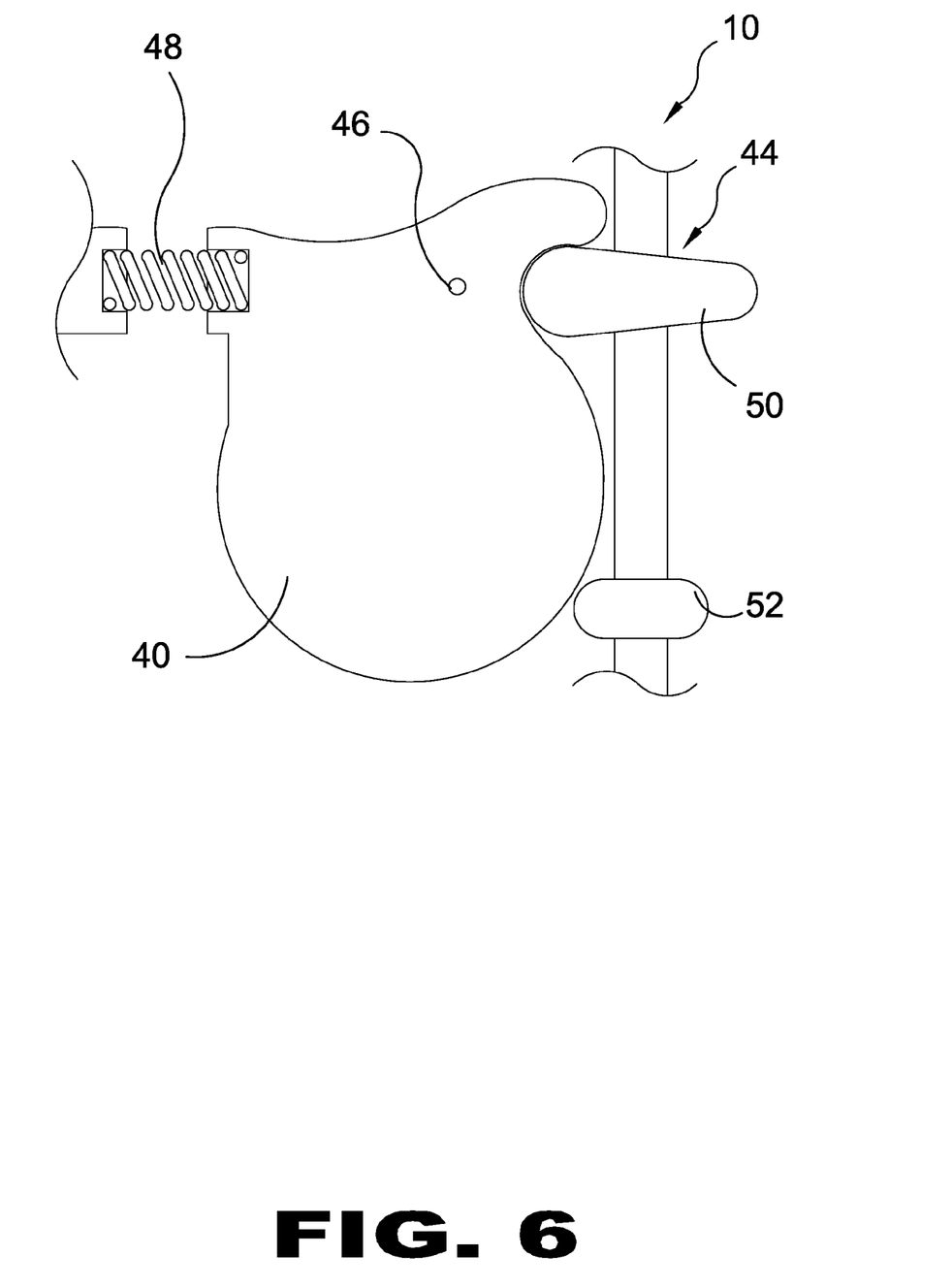
FIG. 6 is a partial view of the magnetic shield of the present invention.

FIG. 6 is a partial view of the magnetic shield 40 of the present invention 10. Shown is a top view of the present invention showing the magnetic shield 40, preferably in the form of a plate, of the present invention positioned to be displaced by means of a cam system 44 applying force about a pivot point 46, with a spring 48 to provide a counter force for a complete cycle. As illustrated, the cam system 44 includes a large cam 50 and a small cam 52.

Figure 7:
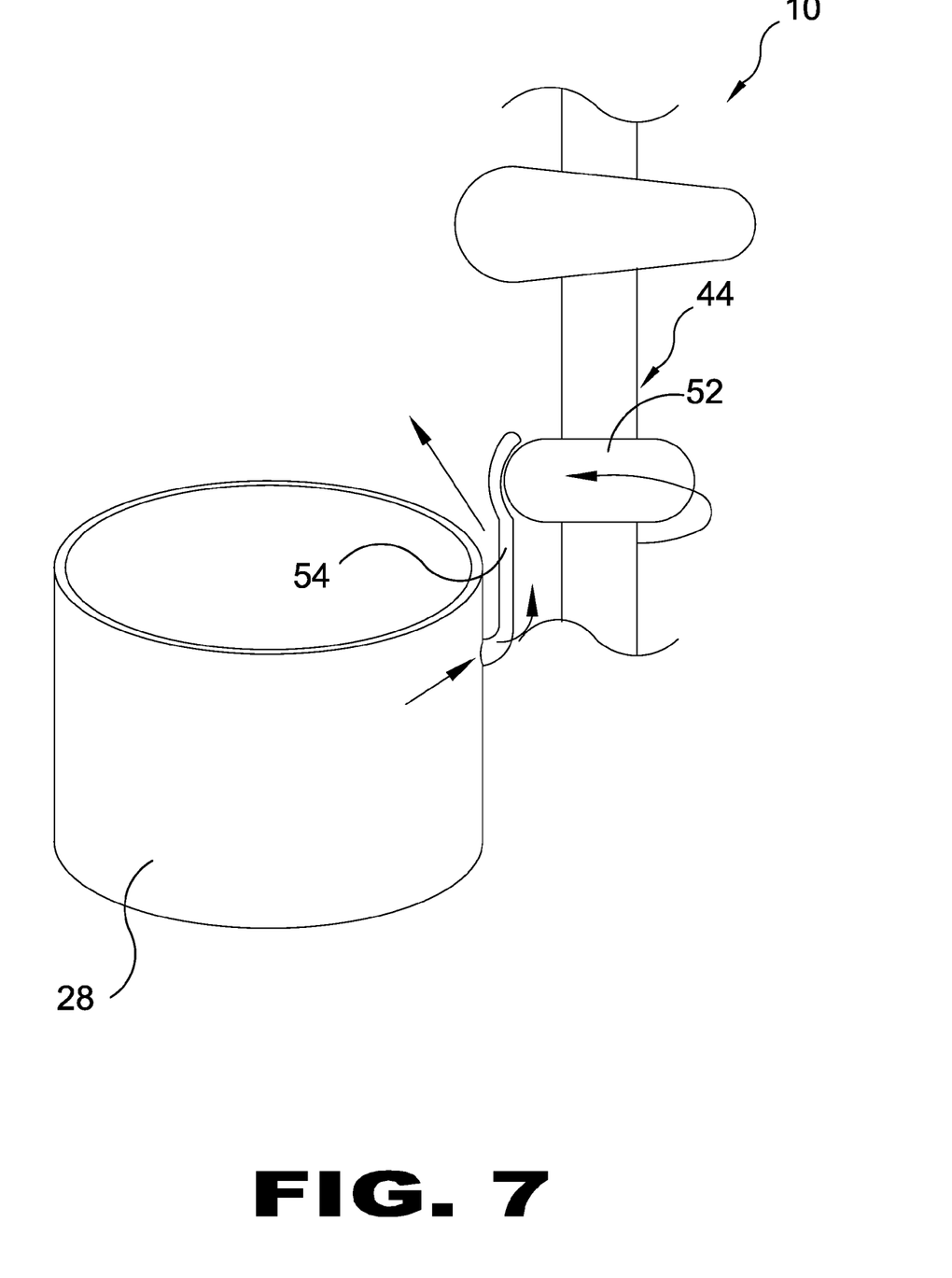
FIG. 7 is a partial view of the cam system of the present invention.

FIG. 7 is a partial view of the cam system 44 of the present invention 10. Shown is a top view of the present invention showing the pressure release 54 serving to be displaced by means of a cam system 44 so that when actuated by the small cam 52 pressure from within the cylinder 28 is released.

Figure 8:
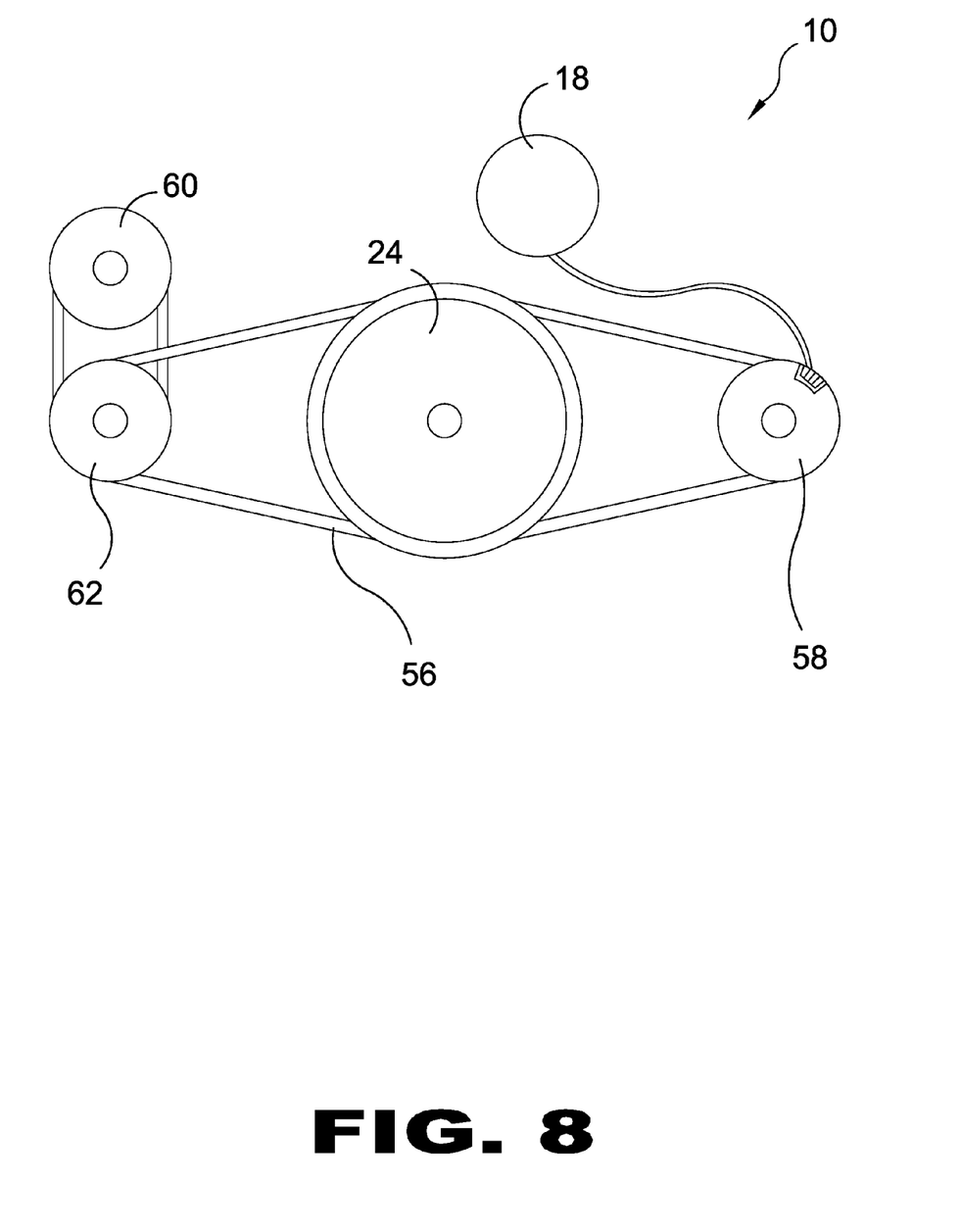
FIG. 8 is a side view of the crankshaft of the motor of the present invention.

FIG. 8 is a side view of the crankshaft 24 of the motor of the present invention 10. Shown is a front view of the present invention illustrating the various components of the present invention that are driven by a belt crankshaft 24 relationship, including a belt 56, alternator 58, AC transformer 18, power steering 60 and air conditioning 62.

Figure 9:
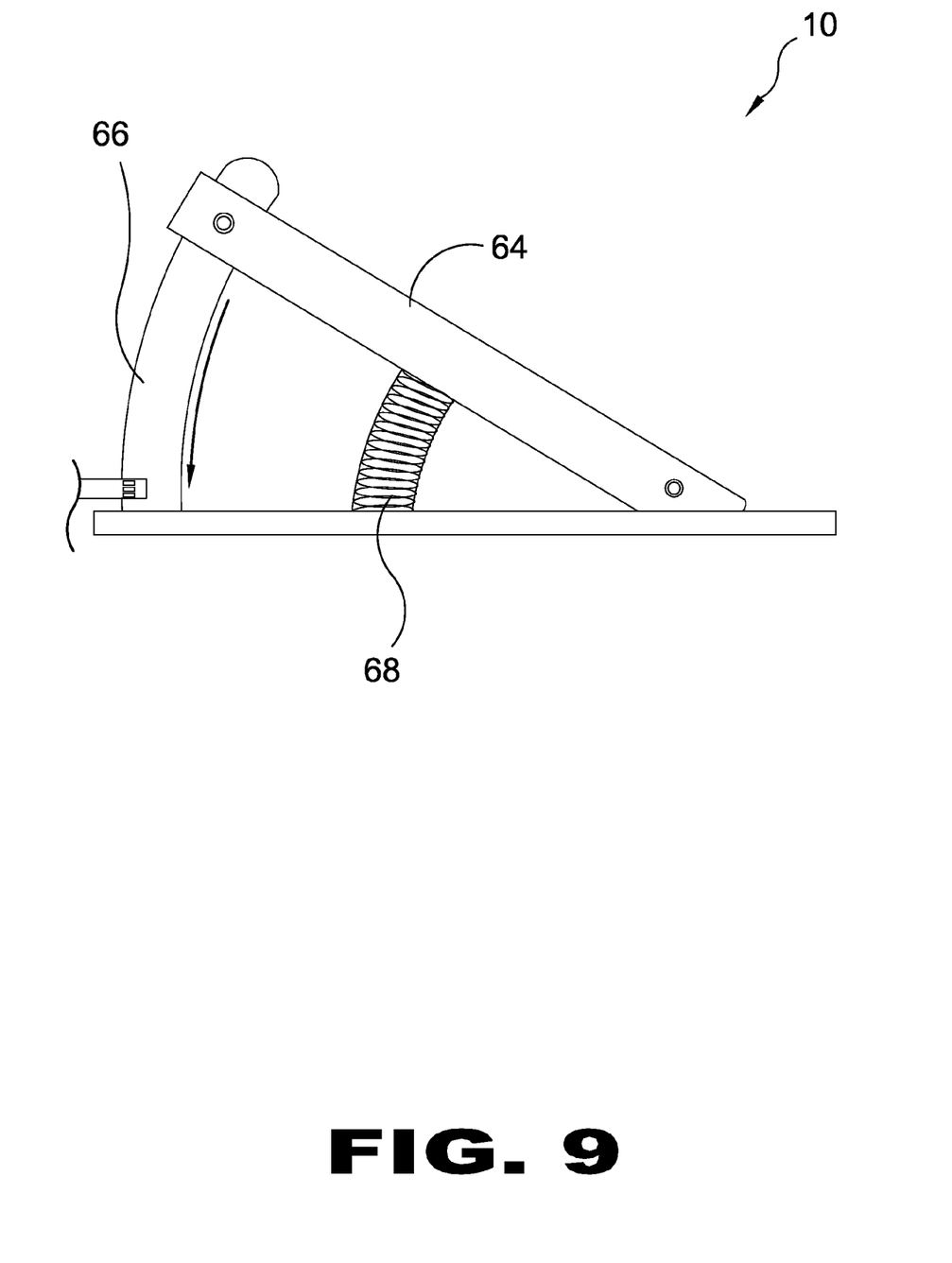
FIG. 9 is a side view of the accelerator pedal.

FIG. 9 is a side view of the accelerator pedal 64. Shown is side view of the accelerator pedal 64 of the present invention 10 depicting a voltage control 66 with a return spring 68 that delivers progressively more power as the pedal 64 is depressed.

Figure 10:
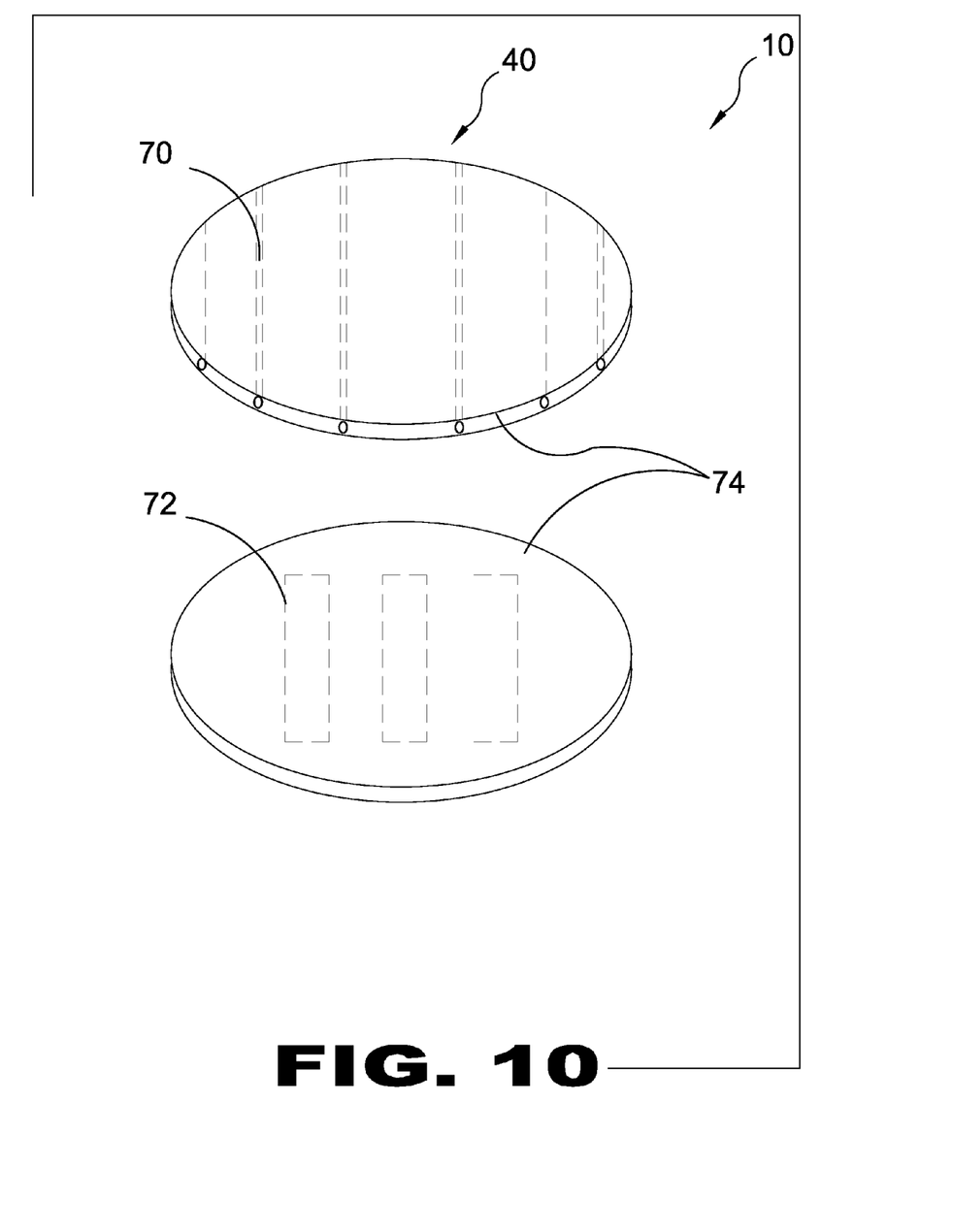
FIG. 10 is a perspective view of embodiments of the magnetic shield of the present invention.

FIG. 10 is a perspective view of embodiments of the magnetic shield 40. The present invention 10 envisions a magnetic shield 40 for impinging redirection through a magnetic flux field conductive member 70 of a magnetic field, a semiconducting material 72 and/or generating a secondary opposing magnetic field used in conjunction with an inorganic polymeric medium 74, such as plastic to shield the steel piston from the magnetic field of the electromagnet at a predetermined piston position negating the magnetic field whereby the steel piston through gravity and cam momentum completes a piston cycle.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims:

1. A magnetic drive motor comprising:
   a) a housing;
   b) a plurality of cylinders bored in said housing, each of said plurality of cylinders having at least an upper end;
   c) a piston reciprocatingly received within each of said plurality of cylinders;
   d) a cylinder head covering said upper end of each of said plurality of cylinders;

e) an electromagnet secured within each said cylinder head;
f) a source of electrical energy coupled with each said electromagnet for delivering electrical energy to each said electromagnet;
g) means for controlling delivery of electrical energy to each said electromagnet such that when said electromagnet receives electrical energy, said electromagnet produces a magnetic force which impinges upon said piston, urging said piston toward said electromagnet;
h) a magnetic shield within each of said cylinders, each said magnetic shield actuatable between a first position shielding said piston from the magnetic force produced by said electromagnet and a second position exposing said piston to the magnetic force produced by said electromagnet;
i) said magnetic shield is formed of an inorganic material;
j) said magnetic shield is in the form of a plate;
k) said inorganic material is polymeric material;
l) said polymeric material is a plastic material; and
m) said magnetic shield contains a material forming a receptor for magnetic flux fields generated by said electromagnet.

2. The magnetic drive motor according to claim 1, wherein said magnetic shield further comprises means for generating an opposing magnetic flux field to the magnetic force produced by said electromagnet.

3. The magnetic drive motor according to claim 2, wherein said housing is an engine block.

4. The magnetic drive motor according to claim 3, further comprising crankshaft means for coupling said pistons to a drive train of a motor vehicle.

5. The magnetic drive motor according to claim 4, wherein said source of electrical energy comprises an AC transformer.

6. The magnetic drive motor according to claim 5, wherein said source of electrical energy is electrically coupled with each said electromagnet by electrically conducting wires.

7. The magnetic drive motor according to claim 6, wherein said means for controlling delivery of electrical energy to each said electromagnet comprises a distributor which controls intervals during which electricity is distributed to said electromagnets.

8. The magnetic drive motor according to claim 7, wherein said cylinder further comprises a brass sleeve.

9. The magnetic drive motor according to claim 8, wherein said cylinder further comprises one or more oil rings.

10. The magnetic drive motor according to claim 9, wherein said cylinder further comprises one or more compression rings.

11. The magnetic drive motor according to claim 10, wherein said cylinder is coated with an insulating material.

12. The magnetic drive motor according to claim 11, wherein said means for controlling delivery of electrical energy to each said electromagnet further comprises:
a) an accelerator pedal coupled to a voltage control; and
b) a return spring for biasing said accelerator pedal upwards such that said voltage control delivers progressively more power as said pedal is depressed.

13. The magnetic drive motor according to claim 1, wherein said plate is actuatable between said first and second positions by means of a cam system applying force about a pivot point with a spring providing counter force.

14. The magnetic drive motor according to claim 13, wherein said cam system further comprises a large cam, a small cam and a pressure release.

15. The magnetic drive motor according to claim 14, wherein said piston is formed of steel.

* * * * *